Oct. 29, 1940.   M. P. YOUKER   2,220,009
FRACTIONATOR DISTILLATE OUTLET
Original Filed March 30, 1933
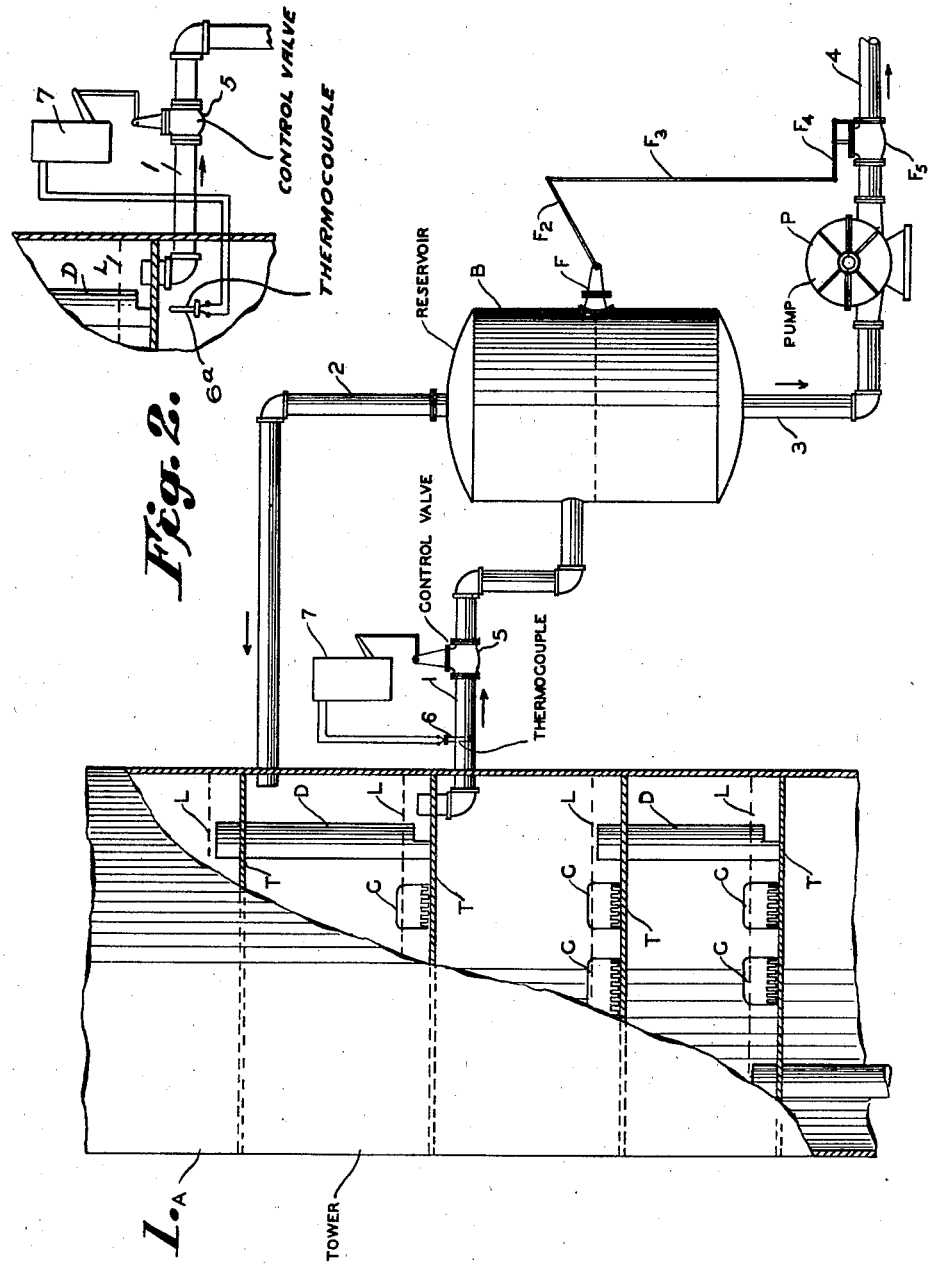
INVENTOR
MALCOLM P. YOUKER
BY Hudson, Young, Shanley and Yinger
ATTORNEY Patented Oct. 29, 1940

2,220,009

UNITED STATES PATENT OFFICE 2,220,009

FRACTIONATOR DISTILLATE OUTLET

Malcolm P. Youker, Bartlesville, Okla., assignor to Phillips Petroleum Company, Bartlesville, Okla., a corporation of Delaware Continuation of application Serial No. 663,621, March 30, 1933. This application May 28, 1938, Serial No. 210,691

7 Claims. (Cl. 196—132)

The present invention relates to an apparatus of value for fractional distillation of liquids, such as hydrocarbon oils, alcohols and the like, and relates in particular to a means for withdrawing liquids from the various sections of a fractionating tower.

When liquid is withdrawn from an intermediate section of a fractionating tower, as, for example, from one of the trays of a bubble tower, the usual practice is to allow the liquid to overflow the edges of a pipe or similar device so arranged as to hold a predetermined level of liquid on the tray, and as a result of such a method of withdrawal, vortices will be created in the liquid leaving the tray, which will tend to include varying amounts of vapor with which the liquid is in contact. This liquid, thus withdrawn, when led outside the tower to a pumping device for further handling, will frequently interrupt the smooth operation of the pump, because the occluded vapors will tend to separate from the liquid in the valve chambers of the pump and cause the pump to become "gas bound" or to lose suction. Such interruptions will react throughout the liquid withdrawal system and will result in complete stoppage of the flow from the plate, or at least will tend to make the flow irregular, which will in turn upset the desired vapor-liquid equilibrium on the plate from which the liquid is withdrawn, and thus tend to render unsatisfactory as a whole the operation of the tower.

It is an object of this invention, therefore, to provide a means of removing this occluded vapor before it has an opportunity of bringing about the above mentioned undesirable effects, and returning it to the tower where it may proceed in the normal course with the main body of vapor.

Other objects of this invention will be apparent to those skilled in the art.

This application is a continuation of my application Serial No. 663,621 filed March 30, 1933.

For a clearer understanding of my invention, and to illustrate one of the forms of devices suitable for carrying out my objects, reference is to be had to the accompanying drawing, in which Figure 1 shows a side elevation partly in vertical section, of a bubble tower equipped with one form of my device. Figure 2 is a side elevation of a detail of a modification.

In the drawing, A is a section of a fractionating tower represented here as a portion of a bubble type tower with traps T, caps and chimneys C, and overflow pipes D. A level of liquid, represented by dotted line L, is maintained on the trays T. The liquid from any desired one of the trays spills over into pipe 1, the top edge or inlet of which is below the level of the liquid L, and is led into the reservoir B (below said level), where the vapors entrained in the liquid entering the reservoir, separate from the liquid and are returned to the tower A through the line 2 which leads from the top of the reservoir. The reservoir B is so placed with respect to the tray from which liquid is to be withdrawn that any level of liquid maintained within the reservoir B will be below the level of liquid L on the tray and will thus permit free gravity flow of liquid from the tray to the reservoir B. A valve 5 is provided in the line 1 to permit regulation of the quantity of liquid flowing from the trap to the reservoir B. This valve may be operated manually or may be operated automatically by thermostatic control, as for example by means of a thermocouple 6 interposed in the pipe 1 as shown in Figure 1, or by means of a thermocouple 6a arranged in the vapor space of the tower immediately below the tray from which the liquid is drawn, as shown in Figure 2. The change in temperature of the liquid on the trap or of the vapors below this tray will actuate any of the well known devices 7 for automatically changing the setting of the valve 5 in accordance with the temperature changes. In other words, an increase in the column temperature adjacent to the tray from which reflux is taken, will indicate that there is insufficient reflux in the tower to accomplish sufficient cooling of the vapors to maintain them at the desired temperature. Such an increase in temperature will therefore affect the thermocouple and as the result the valve 5 will be closed more or less to decrease the flow of reflux through the pipe 1. On the other hand, a decrease in temperature adjacent the tray from which the reflux is withdrawn will indicate that there is more than sufficient reflux within the tower to accomplish the desired cooling, and consequently, the thermocouple will operate to increase the opening of the valve 5 so that more reflux may be withdrawn from the tray through pipe 1. The line 1 enters the reservoir at a point intermediate the top and bottom, preferably nearer the top, which allows for rapid escape of the occluded vapors and provides sufficient volume of liquid in the lower portion of the reservoir to keep pump P, primed at all times. Pump P withdraws the vapor-free liquid from the bottom of the reservoir B through line 3 and discharges it to a tank or some other portion of the system (not shown). A cooler (not shown) may be interposed in line 3, or pump P may be arranged to discharge through a cooling device if so desired. Such arrangements being well known to those skilled in the art.

The reservoir B may be provided with a float control F. By means of this control, a pivoted arm F2 operates a link F3 which is pivotally connected at F4 to a valve F5 interposed in the pump outlet pipe 4. Due to this construction, if the liquid level in the reservoir falls, the valve F5 will be closed, and if the liquid level L rises, the valve F5 will be opened, whereby the quantity of liquid removed by the pump P may be regulated so that the level is maintained in the reservoir B at all times.

While I have disclosed a preferred embodiment of the invention in such manner that the same may be readily understood by those skilled in the art, it is apparent that changes may be made in the details disclosed, without departing from the spirit of the invention, as expressed in the claims.

I claim:

1. An apparatus for withdrawing a portion of the liquid which flows downward through a fractionating tower, which consists of a first pipe, a valve positioned in said first pipe, and a temperature regulating device, one end of said pipe being so disposed with respect to said fractionating tower as to receive said liquid, said temperature regulating device being connected to said valve to actuate the same and so disposed with respect to said fractionating tower and said valve as to decrease the opening through said valve with increases in the temperature of the fractionating tower adjacent the inlet of said pipe, and increase the opening through said valve with decreases in the temperature of the fractionating tower adjacent the inlet of said pipe, a reservoir adapted to receive liquid from said first pipe, a second pipe so disposed as to carry vapors from said reservoir to said fractionating tower, and a third pipe leading from said reservoir.

2. An apparatus for withdrawing a portion of the liquid which flows downward through a fractionating tower, which consists of a first pipe, a first valve positioned in said first pipe, and a temperature regulating device, one end of said pipe being so disposed with respect to said fractionating tower as to receive said liquid, said temperature regulating device being connected to said first valve to actuate the same and so disposed with respect to said fractionating tower and said valve as to decrease the opening through said valve with increases in the temperature of the fractionating tower adjacent the inlet of said pipe and increase the opening through said valve with decreases in the temperature of the fractionating tower adjacent the inlet of said pipe, a reservoir adapted to receive liquid from said first pipe, a second pipe so disposed as to carry vapors from said reservoir to said fractionating tower, a third pipe leading from said reservoir, and a second valve disposed in said third pipe.

3. An apparatus for withdrawing a portion of the liquid which flows downward through a fractionating tower, which consists of a first pipe, a first valve positioned in said first pipe, and a temperature regulating device, one end of said pipe being so disposed with respect to said fractionating tower as to receive said liquid, said temperature regulating device being connected to said first valve and so disposed with respect to said fractionating tower and said valve as to decrease the opening through said valve with increases in the temperature of the fractionating tower adjacent the inlet of said pipe and increase the opening through said valve with decreases in the temperature of the fractionating tower adjacent the inlet of said pipe, a reservoir adapted to receive liquid from said first pipe, a second pipe so disposed as to carry vapors from said reservoir to said fractionating tower, a third pipe leading from said reservoir, a second valve disposed in said third pipe, and a liquid level control connected to said second valve and so disposed as to increase or decrease the opening through said second valve with respect to a raising or lowering of the liquid level in said reservoir.

4. In an oil and vapor separating apparatus, the combination with a fractionating tower having a plurality of bubble trays therein, of a liquid reservoir external to said tower, a pipe connecting the tower and reservoir and through which reflux liquid is delivered to said reservoir from one of said bubble trays, a valve in said pipe to control the flow of said liquid therethrough, a thermocouple responsive to temperature conditions of the tower positioned adjacent to the tray for controlling said valve to close the same with increases in the temperature and to open the same with decreases in the temperature, a second pipe connecting the top of the reservoir to the fractionating tower at a point above the liquid level of the last mentioned tray, a pipe for withdrawing vapor free liquid from the lower portion of said reservoir, a pump interposed in the last mentioned pipe, a valve in the last mentioned pipe, and means responsive to the liquid level in the reservoir for controlling the last mentioned valve, said pump being disposed between the last mentioned valve and the reservoir.

5. An apparatus of the character described comprising a fractionating tower having positioned therein a plurality of bubble trays for the collection of liquid thereon, a liquid reservoir positioned externally of said tower, a pipe connecting said reservoir and one of said trays, a valve in said pipe, a thermocouple positioned in said pipe immediately adjacent the connection thereof with said tray, means responsive to said thermocouple to actuate said valve to open the same upon a decrease in temperature of the liquid flowing through said pipe and to close said valve upon an increase in temperature of said liquid, a second pipe connecting the top portion of said reservoir with said fractionating tower at a point above said bubble tray for conducting vapor from said reservoir to said tower, a pipe connected to the bottom portion of said reservoir for the withdrawal therethrough of vapor free liquid, and a valve interposed in said last pipe to control the withdrawal of said vapor free liquid.

6. In an oil and vapor separating apparatus, the combination with a fractionating tower having a plurality of bubble trays therein for the collection of liquid thereon, a liquid reservoir external to said tower, a pipe connecting one of said trays in said fractionating tower and said reservoir through which reflux liquid is delivered to the reservoir from one of said bubble trays, a valve in said pipe to control the flow of said reflux liquid, a thermocouple acutely responsive to temperature conditions positioned in said pipe immediately adjacent said fractionating tower at the point where said reflux liquid from the said trays initially flows through said pipe from said tower, means actuated by said thermocouple to actuate said valve to increase the opening of the same upon a decrease in temperature of the reflux liquid flowing through said pipe and to decrease the opening of said valve upon an increase in the temperature of said reflux liquid, a second pipe connecting the top of said reservoir with said fractionating tower at a point above the liquid level of said bubble tray for the return of vapors from said reservoir to said fractionating tower, a pipe connected to the bottom of said reservoir for the withdrawal of vapor free liquid, a valve in said last mentioned pipe and means responsive to the liquid level of said reservoir to control the same.

7. In a fractionating tower side stream control, the combination including a fractionating tower and a liquid reservoir, trays in said fractionating tower on which pools of condensate are adapted to collect, a line connecting one of said trays with the liquid reservoir for withdrawing from said tray a side stream, said line being connected to said fractionating tower solely at said tray, valve means in the withdrawal line for controlling the rate of condensate withdrawal from said tray, thermostatic means within the fractionating tower adjacent said tray, and means responsive to said thermostatic means for opening said valve means as the temperature of said thermostatic means decreases and for closing said valve means as the temperature of said thermostatic means increases whereby a product of uniform quality is obtained.

MALCOLM P. YOUKER.